(No Model.)

W. N. WEEDEN.
MATCH SAFE.

No. 268,760. Patented Dec. 5, 1882.

Witnesses:
Jas. E. Hutchinson.
Henry C. Hazard.

Inventor:
Wm. N. Weeden, by
Geo. S. Prindle, his Atty (No Model.)
W. N. WEEDEN.
MATCH SAFE.
No. 268,760. Patented Dec. 5, 1882.
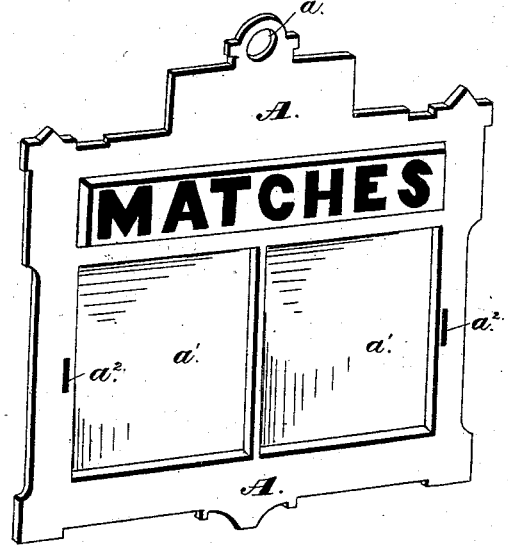
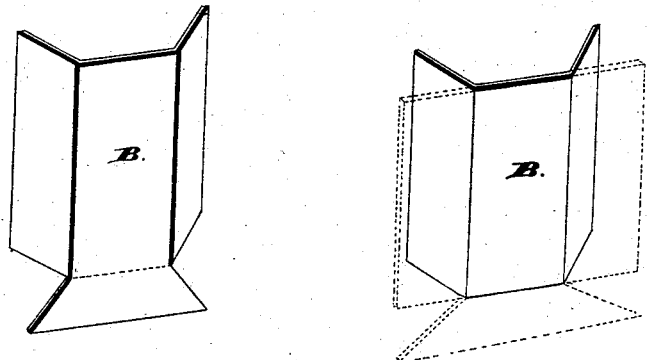
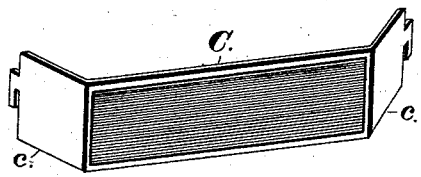
Witnesses:
Jas. E. Hutchinson.
Henry C. Hazard.
Inventor.
Wm. N. Weeden, by
Geo. L. Prindle, his Atty.

UNITED STATES PATENT OFFICE.

WILLIAM N. WEEDEN, OF NEW BEDFORD, MASSACHUSETTS.

MATCH-SAFE.

SPECIFICATION forming part of Letters Patent No. 268,760, dated December 5, 1882.

Application filed October 25, 1882. (No model.)

*To all whom it may concern:*

Be it known that I, WILLIAM N. WEEDEN, of New Bedford, in the county of Bristol, and in the State of Massachusetts, have invented certain new and useful Improvements in Match-Safes; and I do hereby declare that the following is a full, clear, and exact description thereof, reference being had to the accompanying drawings, making a part of this specification, in which—

Figure 1:
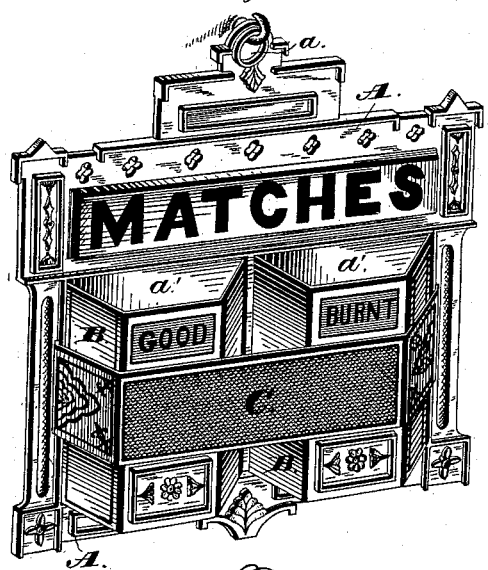
Figure 2:
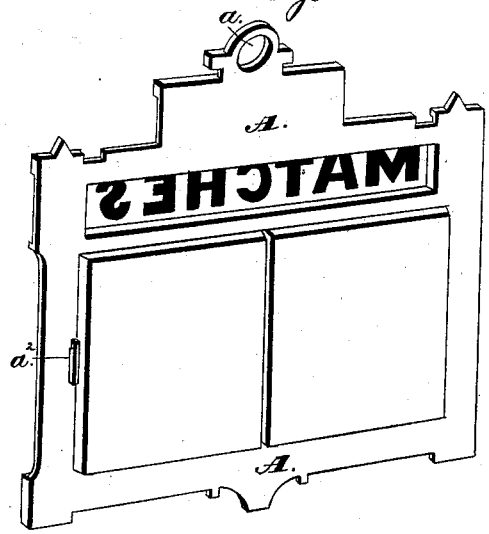

Figure 1 is a perspective view of my device from the front. Fig. 2 is a like view of the same from the rear, and Fig. 3 is a perspective view of the parts of said device separated from each other.

Letters of like name and kind refer to like parts in each of the figures.

The design of my invention is to simplify the construction, to lessen the expense, and to increase the efficiency of match-safes; and to this end said invention consists in the construction and combination of parts, substantially as and for the purpose hereinafter specified.

In the annexed drawings, A represents the back plate of my device, which has a general rectangular form in front elevation, and at or within its upper edge is provided with an opening, $a$, through which may be passed a hook or nail for suspending the same from a wall or other suitable support. Within the face of the plate A is provided one or more recesses, $a'$, which each correspond in size and shape to the like features of the rear side of the receptacle for matches, and have a depth substantially equal to or slightly in excess of the thickness of the material from which said plate is made. Said recesses are preferably formed by stamping or embossing, or, when cast metal is employed, may be formed by molding.

Fitted within and over each recess $a$ is a plate, B, which is formed of one piece that when cut from a sheet has the shape shown by dotted lines in Fig. 3, and is then bent to the form shown by the full lines of said figure, so as to constitute the front, sides, and bottom of the box for containing matches. The rear edges of the sides and bottom of said plate fit within the corresponding edges of said recess, by which arrangement the latter constitutes the back of the box.

If desired, the recesses $a'$ may be omitted, and in place of the same lugs formed upon the plate A to engage with and hold in position the edge of the plate B, or the edge of the latter may be provided with spurs, and corresponding openings formed in said plate A to receive the same.

The plate B is secured in position by means of a band, C, which extends around the front side of the same, and has its rearwardly-extending ends $c$ contained within corresponding openings $a^2$, that are provided within the back plate, A. Said ends $c$ are preferably hooked, and are caused to engage with said back plate by being moved downward after insertion within said openings $a^2$; but any equivalent form of fastening may be employed if desired. The face of the band C is preferably roughened to form a friction-surface upon which to ignite matches.

The device described consists of but three pieces, each of which may be formed with dies, so as to require no fitting, and the whole easily and quickly combined or separated at any time and by any person.

When arranged for use the safe is convenient, efficient, strong, and durable, and in consequence of its construction can be produced at a small cost.

Having thus fully set forth the nature and merits of my invention, what I claim as new is—

1. As a new article of manufacture, the hereinbefore-described match-safe, composed of the plates A, B, and C, constructed and combined in the manner and for the purpose substantially as specified.

2. A match-safe in which are combined a front, sides, and bottom, formed of one piece, a back, and a plate or band which operates to bind said parts together, substantially as and for the purpose set forth.

In testimony that I claim the foregoing, I have hereunto set my hand this 21st day of October, 1882.

WILLIAM N. WEEDEN.

Witnesses:
 FREDK. C. S. BARTLETT,
 WILLIAM F. CASWELL.